US011965518B2

United States Patent
Williams et al.

(10) Patent No.: US 11,965,518 B2
(45) Date of Patent: Apr. 23, 2024

(54) MOTOR ASSEMBLY FOR DRIVING A PUMP OR ROTARY DEVICE HAVING A COOLING DUCT

(71) Applicant: ITT Manufacturing Enterprises LLC, Wilmington, DE (US)

(72) Inventors: Dean P. Williams, Morovia, NY (US); Daniel J. Kernan, Liverpool, NY (US); Christopher J. F. Tighe, Hathern (GB)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 17/882,042

(22) Filed: Aug. 5, 2022

(65) Prior Publication Data

US 2023/0332608 A1    Oct. 19, 2023

Related U.S. Application Data

(63) Continuation of application No. 16/748,544, filed on Jan. 21, 2020, now Pat. No. 11,448,225.

(51) Int. Cl.
*F04D 25/08* (2006.01)
*F04B 39/06* (2006.01)
(Continued)

(52) U.S. Cl.
CPC .......... *F04D 25/082* (2013.01); *F04B 39/066* (2013.01); *F04B 53/08* (2013.01);
(Continued)

(58) Field of Classification Search
CPC ...... F04D 25/082; F04D 19/002; F04D 25/06; F04D 29/281; F04D 29/545;
(Continued)

(56) References Cited

U.S. PATENT DOCUMENTS

| 4,468,725 A | 8/1984 | Venturini |
| 4,992,687 A | 2/1991 | Nel |

(Continued)

FOREIGN PATENT DOCUMENTS

| CN | 101878582 A | 11/2010 |
| CN | 103296955 A | 9/2013 |

(Continued)

OTHER PUBLICATIONS

Apap, Maurice. "Direct Converter Technology Applied to an Integrated Motor Drive". Doctor of Philosophy Thesis, Dec. 2005.
(Continued)

*Primary Examiner* — Peter J Bertheaud
(74) *Attorney, Agent, or Firm* — Knobbe, Martens, Olson & Bear, LLP

(57) ABSTRACT

A motor assembly for driving a pump (e.g., liquid pump) includes an electric motor with an output shaft. A motor frame houses the electric motor so that the output shaft protrudes from an end of the motor frame. A plate assembly is coupleable about the output shaft to the end of the motor frame. The please assembly has a cavity that houses motor drive electronics. The plate assembly further defines a duct that extends between a central opening and one or more openings on an outer radial wall of the plate assembly. A fan is coupled to the output shaft so that the plate assembly is disposed between the fan and the motor frame. Rotation of the output shaft by the electric motor rotates the fan, causing air to flow through the duct. Air flow through the duct inhibits heat transfer between the electric motor and the motor drive electronics.

19 Claims, 13 Drawing Sheets

(51) Int. Cl.

| | | |
|---|---|---|
| F04B 53/08 | (2006.01) | |
| F04D 19/00 | (2006.01) | |
| F04D 25/06 | (2006.01) | |
| F04D 29/28 | (2006.01) | |
| F04D 29/54 | (2006.01) | |
| F04D 29/58 | (2006.01) | |
| F04D 29/70 | (2006.01) | |
| H02K 5/15 | (2006.01) | |
| H02K 5/18 | (2006.01) | |
| H02K 5/20 | (2006.01) | |
| H02K 5/22 | (2006.01) | |
| H02K 7/14 | (2006.01) | |
| H02K 9/04 | (2006.01) | |
| H02K 9/06 | (2006.01) | |
| H02K 9/14 | (2006.01) | |
| H02K 11/33 | (2016.01) | |

(52) U.S. Cl.
CPC ........... *F04D 19/002* (2013.01); *F04D 25/06* (2013.01); *F04D 29/281* (2013.01); *F04D 29/545* (2013.01); *F04D 29/547* (2013.01); *F04D 29/5806* (2013.01); *F04D 29/703* (2013.01); *H02K 5/15* (2013.01); *H02K 5/18* (2013.01); *H02K 5/20* (2013.01); *H02K 5/225* (2013.01); *H02K 7/14* (2013.01); *H02K 9/04* (2013.01); *H02K 9/06* (2013.01); *H02K 9/14* (2013.01); *H02K 11/33* (2016.01); *H02K 2211/03* (2013.01)

(58) Field of Classification Search
CPC .. F04D 29/547; F04D 29/5806; F04D 29/703; F04B 39/066; F04B 53/08; H02K 5/15; H02K 5/18; H02K 5/20; H02K 5/225; H02K 7/14; H02K 9/04; H02K 9/06; H02K 9/14; H02K 11/33
See application file for complete search history.

(56) References Cited

U.S. PATENT DOCUMENTS

| | | | |
|---|---|---|---|
| 5,491,370 A | 2/1996 | Schneider et al. | |
| 5,763,969 A | 6/1998 | Metheny et al. | |
| 5,939,807 A | 8/1999 | Patyk et al. | |
| 5,960,535 A | 10/1999 | Rubens | |
| 6,177,740 B1 | 1/2001 | Burns | |
| 6,198,183 B1 | 3/2001 | Baeumel et al. | |
| 6,496,343 B2 | 12/2002 | Mahlein et al. | |
| 6,559,532 B1 | 5/2003 | Schwarzbauer et al. | |
| 6,603,647 B2 | 8/2003 | Briesen et al. | |
| 6,731,036 B2 | 5/2004 | Ghiotto | |
| 6,744,650 B2 | 6/2004 | Briesen et al. | |
| 6,856,038 B2 | 2/2005 | Rebsdorf et al. | |
| 7,180,212 B2 | 2/2007 | Anwar | |
| 7,199,496 B2 | 4/2007 | Suzuki et al. | |
| 7,362,017 B2 | 4/2008 | Piper et al. | |
| 7,848,121 B2 | 12/2010 | Kojori et al. | |
| 7,881,087 B2 | 2/2011 | Sakakibara et al. | |
| 7,911,093 B2 | 3/2011 | Schueren | |
| 7,923,875 B2 | 4/2011 | Henry | |
| 7,977,832 B2 | 7/2011 | Vadillo | |
| 8,310,121 B2 | 11/2012 | Fujita et al. | |
| 8,576,528 B2 | 11/2013 | Nagano et al. | |
| 8,810,086 B2 | 8/2014 | Best et al. | |
| 9,276,489 B2 | 3/2016 | Fujita et al. | |
| 9,531,239 B2 | 12/2016 | Maschke et al. | |
| 9,564,797 B2 | 2/2017 | Kagimura et al. | |
| 10,788,051 B2 | 9/2020 | Wu | |
| 11,448,225 B2 | 9/2022 | Williams et al. | |
| 2001/0021116 A1 | 9/2001 | Bruckmann et al. | |
| 2002/0158524 A1 | 10/2002 | Bobay | |
| 2010/0126703 A1 | 5/2010 | Ruan et al. | |
| 2010/0149848 A1 | 6/2010 | Urushibata et al. | |
| 2011/0101804 A1 | 5/2011 | Isoda | |
| 2011/0176340 A1 | 7/2011 | Sakakibara | |
| 2012/0020021 A1 | 1/2012 | Kishimoto et al. | |
| 2013/0076172 A1 | 3/2013 | Koyama | |
| 2013/0127251 A1 | 5/2013 | Graovac et al. | |
| 2013/0328424 A1 | 12/2013 | Goto | |
| 2014/0139059 A1 | 5/2014 | De Filippis | |
| 2014/0306361 A1 | 10/2014 | Pugh | |
| 2015/0076970 A1 | 3/2015 | Oowatari | |
| 2015/0229233 A1 | 8/2015 | Quevedo et al. | |
| 2017/0264171 A1* | 9/2017 | Williams | H02K 7/14 |
| 2018/0309343 A1 | 10/2018 | Tolksdorf et al. | |

FOREIGN PATENT DOCUMENTS

| | | |
|---|---|---|
| CN | 103780072 B | 4/2017 |
| CN | 106911277 A | 6/2017 |
| EP | 1311057 | 5/2003 |
| EP | 1715565 | 10/2006 |
| EP | 1973222 | 9/2008 |
| EP | 1495533 | 3/2009 |
| EP | 2156541 B1 | 11/2012 |
| EP | 2849549 A1 | 3/2015 |
| JP | 2015/099829 A | 5/2015 |
| WO | WO 2009/069103 A2 | 6/2009 |

OTHER PUBLICATIONS

Casadei, Domenico et al., "Optimal Use of Zero Vectors for Minimizing the Output Current Distortion in Matrix Converters", IEEE Transactions on Industrial Electronics, vol. 56, No. 2, Feb. 2009, pp. 326-336.
Chinese Office Action for Application No. 201780015441.0, dated Oct. 28, 2019 with English translation in 21 pages.
International Preliminary Report on Patentability for PCT/US2017/022019, dated Sep. 11, 2018 in 9 pages.
International Search Report and Written Opinion for PCT Application No. PCT/US2017/022019, dated Jul. 27, 2017 in 12 pages.
Wheeler, P.W. et al. "A Fully Integrated 30kW Motor Drive Using Matrix Converter Technology", IEEE Xplore, pp. 2390-2395, downloaded on Mar. 25, 2009.
International Search Report and Written Opinion for PCT Application No. PCT/US2021/014151, dated Apr. 28, 2021 in 15 pages.

* cited by examiner

MOTOR ASSEMBLY FOR DRIVING A PUMP OR ROTARY DEVICE HAVING A COOLING DUCT

BACKGROUND

Field

This invention relates broadly to an electric motor assembly for driving a pump, and more particularly to an electric motor assembly having a cooling duct that provides improved thermal isolation of the electric motor from drive electronics of the electric motor assembly.

Description of the Related Art

Industrial pumps are used to pump fluids, such as chemicals, in an industrial setting (e.g., a chemical manufacturing plant). Such pumps include an electric motor to drive the pump (e.g., drive the rotation of the pump impeller) and electronics to power and/or control the operation of the electric motor. Operation of the electric motor generates heat.

SUMMARY

It is an object of this disclosure to provide an electric motor assembly (e.g., for use with industrial pumps) that has improved heat dissipation to reduce the exposure of the electronics of the assembly to heat generated by the electric motor.

In accordance of with one aspect of the disclosure, a plate assembly for use with an electric motor assembly (e.g., that can be used with industrial pumps) has a cooling duct through which air flows to dissipate heat generated by the electric motor and reduce the exposure of the electronics in the plate assembly to heat from the electric motor (e.g., the cooling duct provides a thermal barrier). In one example, such a cooling duct can aid in reducing a temperature the electronics are exposed to as compared to a similar electric motor assembly using typical insulation material between the electronics and the electric motor.

In accordance with another aspect of the disclosure, an electric motor assembly for driving a pump is provided. The assembly comprises an electric motor having an output shaft that extends along a central axis of the electric motor, the electric motor being operable to rotate the output shaft. A motor frame houses the electric motor so that the output shaft protrudes from an end of the motor frame. A plate assembly having a central opening is configured to receive the output shaft therethrough. The plate assembly is coupleable about the output shaft proximate to the end of the motor frame. The plate assembly defines a chamber configured to house motor drive electronics. The plate assembly further defines a duct that extends between the central opening and one or more openings on an outer radial wall of the plate assembly, so that the duct is at least partially disposed between the electric motor and the motor drive electronics. A fan is coupleable to the output shaft so that the plate assembly is disposed between the fan and the motor frame. Operation of the electric motor rotates the output shaft to rotate the fan. Rotation of the fan causes air to flow through the duct and to exit out of said one or more openings. Air flow through the duct inhibits heat transfer between the electric motor and the motor drive electronics (e.g., air flow through the duct at least partially thermally isolates the motor drive electronics from heat generated by the electric motor).

In accordance with another aspect of the disclosure, a plate assembly is provided configured for use with an electric motor assembly for driving a pump. The electric motor assembly can have an electric motor with an output shaft, a motor frame that houses the electric motor and a fan rotatably coupleable to the output shaft. The plate assembly comprises a central opening configured to receive the output shaft therethrough, the plate assembly coupleable about the output shaft proximate to an end of the motor frame and defining a chamber that houses motor drive electronics. The plate assembly also comprises a duct that extends between the central opening and one or more openings on an outer radial wall of the plate assembly, the duct configured to be at least partially disposed between the electric motor and the motor drive electronics. Operation of the fan causes air to flow through the duct and to exit out of said one or more openings. Air flow through the duct inhibits heat transfer between the electric motor and the motor drive electronics (e.g., air flow through the duct at least partially thermally isolates the motor drive electronics from heat generated by the electric motor).

DETAILED DESCRIPTION

Figure 1A:
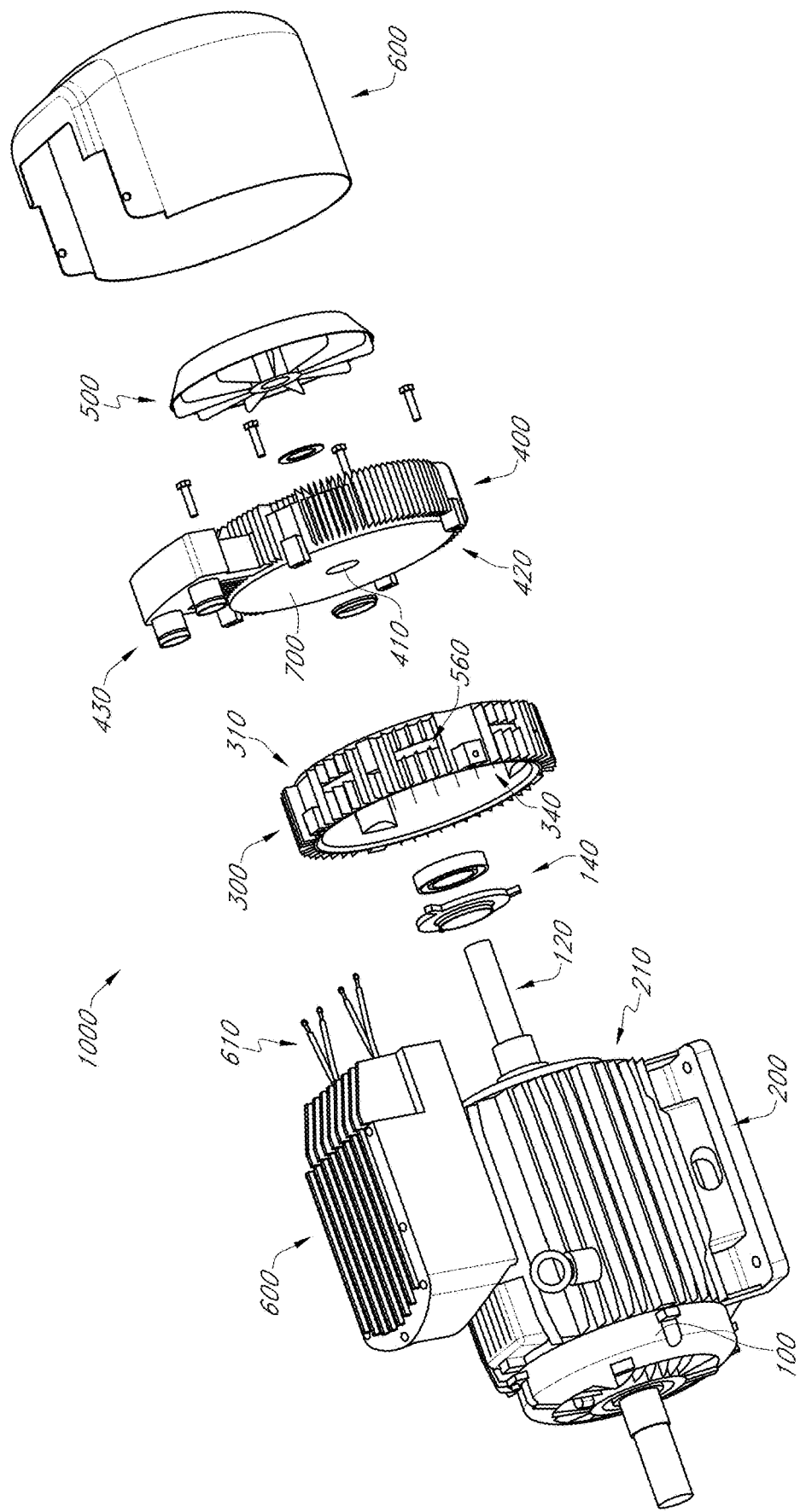
FIG. 1A is an exploded view of an electric motor assembly for driving a pump or rotary device.
Figure 1B:
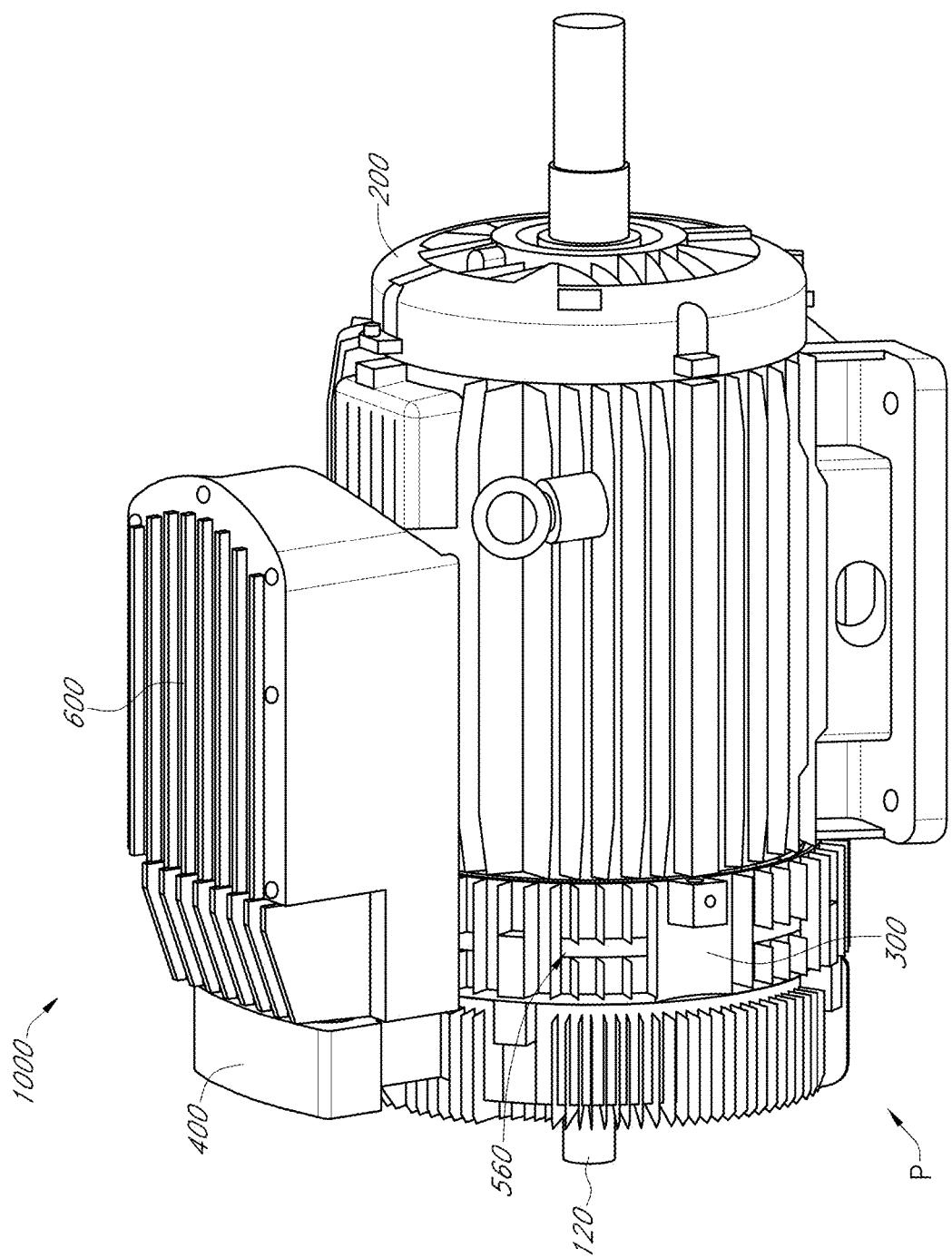
FIG. 1B is a partially assembled view of the electric motor assembly of FIG. 1A, excluding the fan and shroud cover.

FIGS. 1A-2A show an example motor assembly 1000. The motor assembly 1000 can optionally be coupled to a pump (not shown) to drive the pump. The motor assembly 1000 includes an electric motor 100 with an output shaft or rotor 120. The motor 100 can be housed in a motor frame 200 so that a first end of the output shaft or rotor 120 protrudes from an end 210 of the motor frame 200. As shown, a second end of the output shaft or rotor 120 protrudes from the other end of the motor frame 210, and may be coupled to the pump. The motor assembly 1000 can include a plate assembly P removably coupleable over the output shaft or rotor 120 to the motor frame 200. The plate assembly P can optionally include one or both of a mid-plate 300 and an end-plate 400. The plate assembly P optionally includes a bearing 140 via which it couples to the output shaft or rotor 120.

Figure 2A:
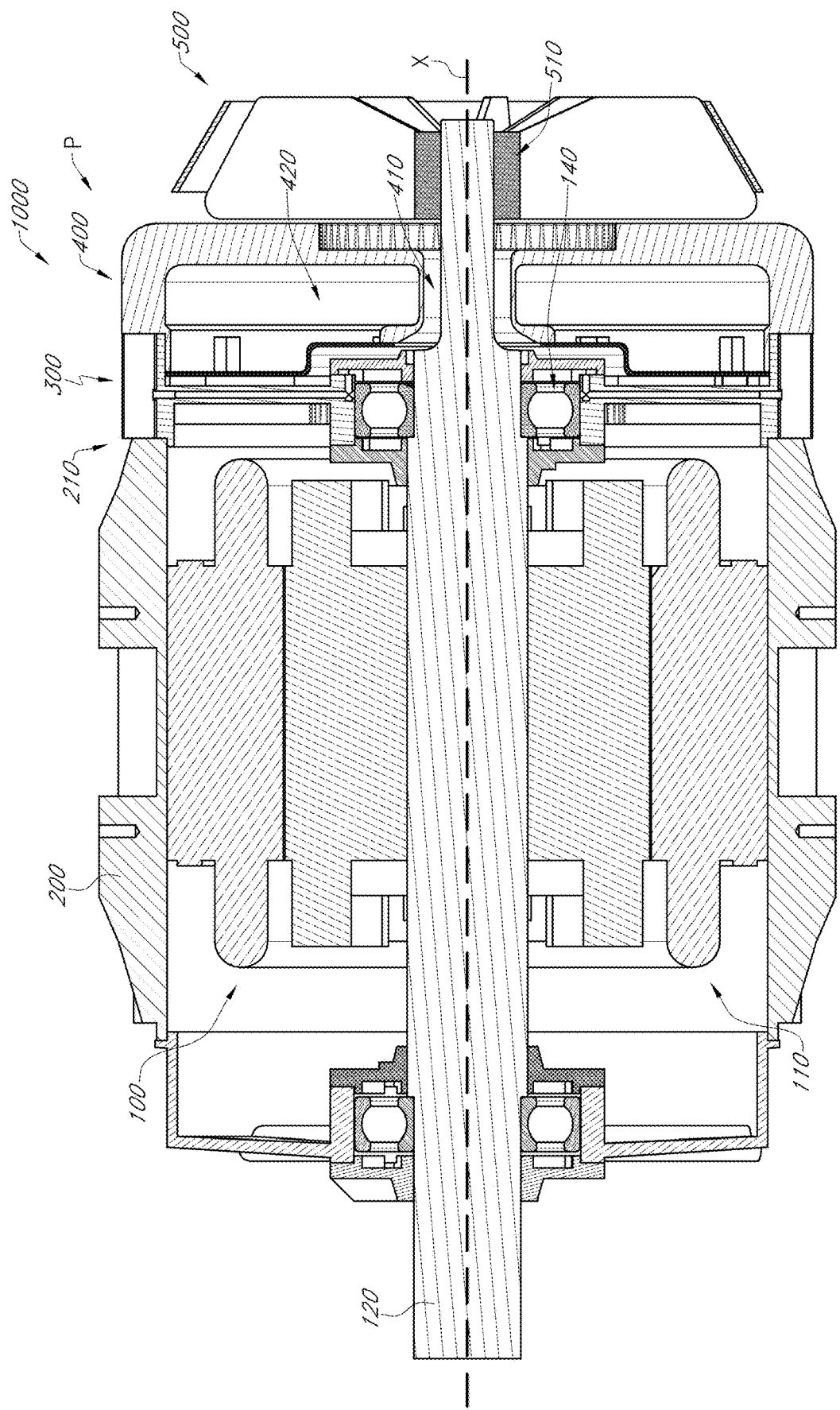
FIG. 2A is a cross-sectional view of the electric motor assembly.
Figure 2B:
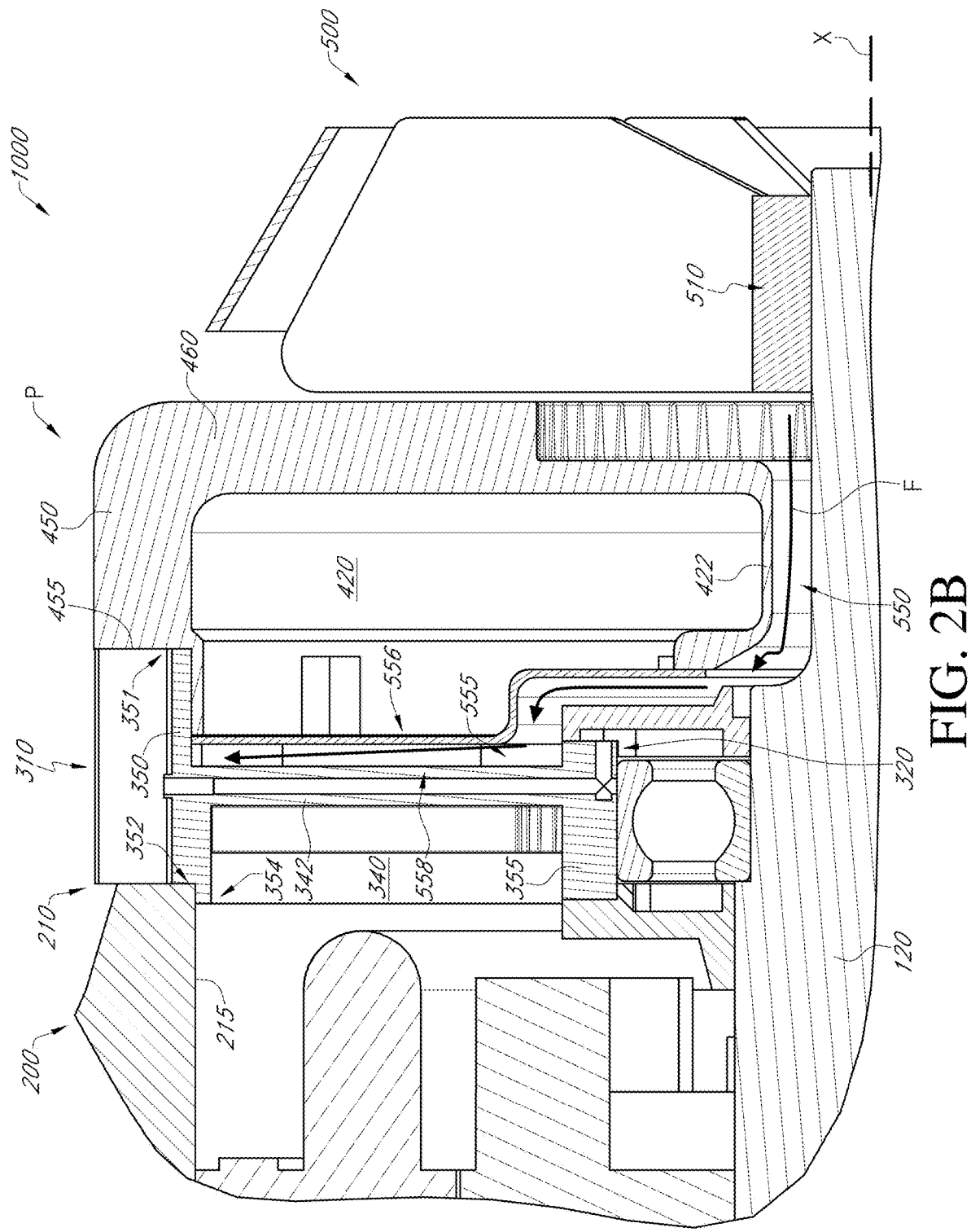
FIG. 2B is an enlarged partial view of the motor assembly in FIG. 2A.
Figure 7:
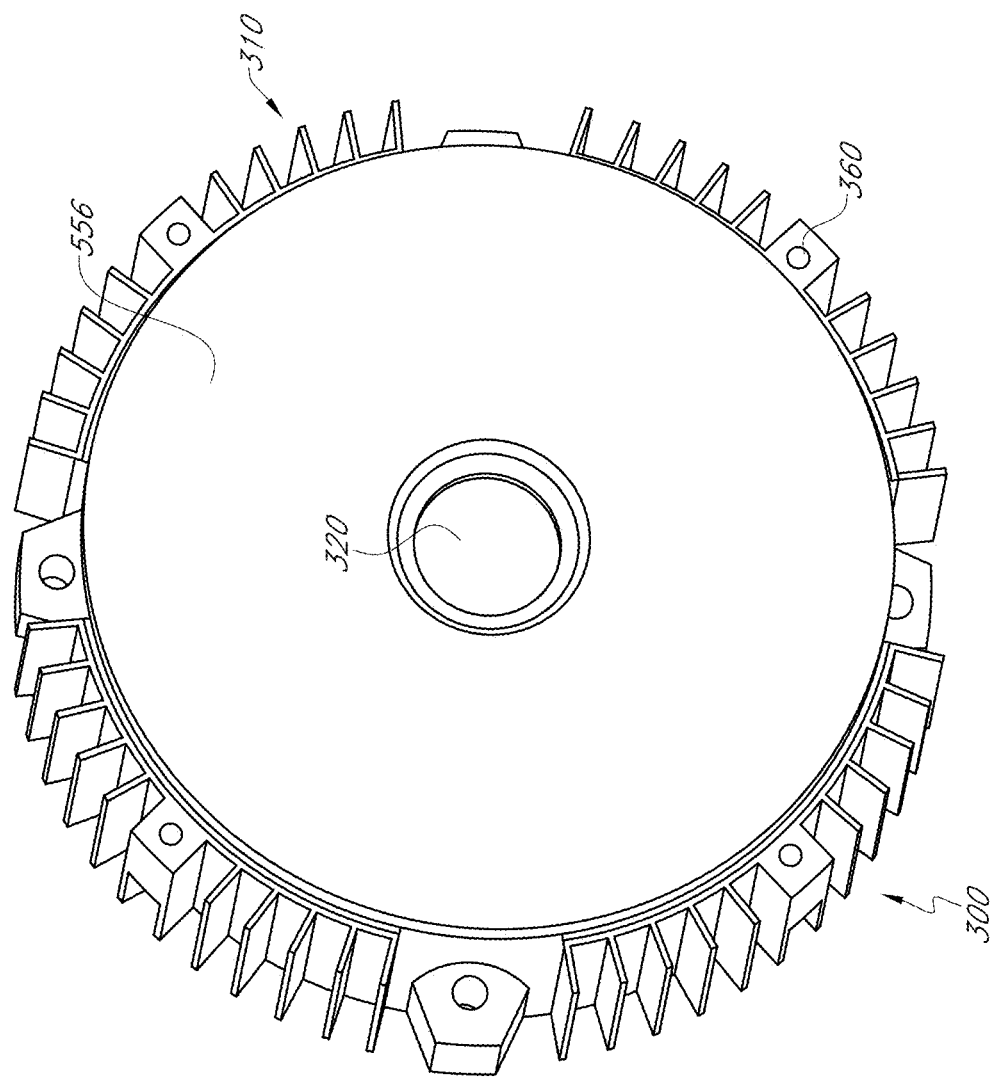
FIG. 7 is a perspective view of the mid-plate of the motor assembly.

The mid-plate 300 can couple to the output shaft or rotor 120 via the bearing 140, which can be disposed in an opening 320 (e.g., bearing housing or sleeve) of the mid-plate 300 (see, e.g., FIGS. 2B and 7). The mid-plate 300 can be disposed adjacent the end 210 of the motor frame 200 and has a recess or cavity 340 that faces the motor frame 200. The mid-plate 300 can have one or more (e.g., a plurality of) heat sink fins 310 extending from an outer surface (e.g., outer peripheral surface) of the mid-plate 300 to facilitate heat dissipation.

The end-plate 400 can coupled to the mid-plate 300 so that the mid-plate 300 is interposed between the end 210 of the motor frame 200 and the end-plate 400. The output shaft or rotor 120 extends through an opening 410 in the end-plate 400. The end-plate 400 can have a cavity 420, defined at least in part by an end wall 460, that receives an electronic module 700 therein, which is further discussed below.

A fan 500 couples to the output shaft or rotor 120 so that the end-plate 400 is interposed between the fan 500 and the mid-plate 300. The fan 500 is rotatably coupled to the output shaft or rotor 120 such that rotation of the output shaft or rotor 120 rotates the fan 500.

A shroud cover 600 can be removably disposed over the mid-plate 300, end-plate 400 and fan 500. The shroud cover 600 can removably attach (e.g., with one or more fasteners, such as screws or bolts) to the motor frame 200.

The motor assembly 1000 can further include a terminal box 600 attached to the motor frame 200. The terminal box 600 has connector wires 610 that can extend into channels 430 of a terminal box connector 440 (see FIG. 8) of the end-plate 400 to electrically connect electronics in the terminal box 600 with electronic module 700 (see FIG. 8) in the end-plate 400. The mid-plate 300 and end-plate 400 can be made of copper, aluminum or cast iron.

Figure 3:
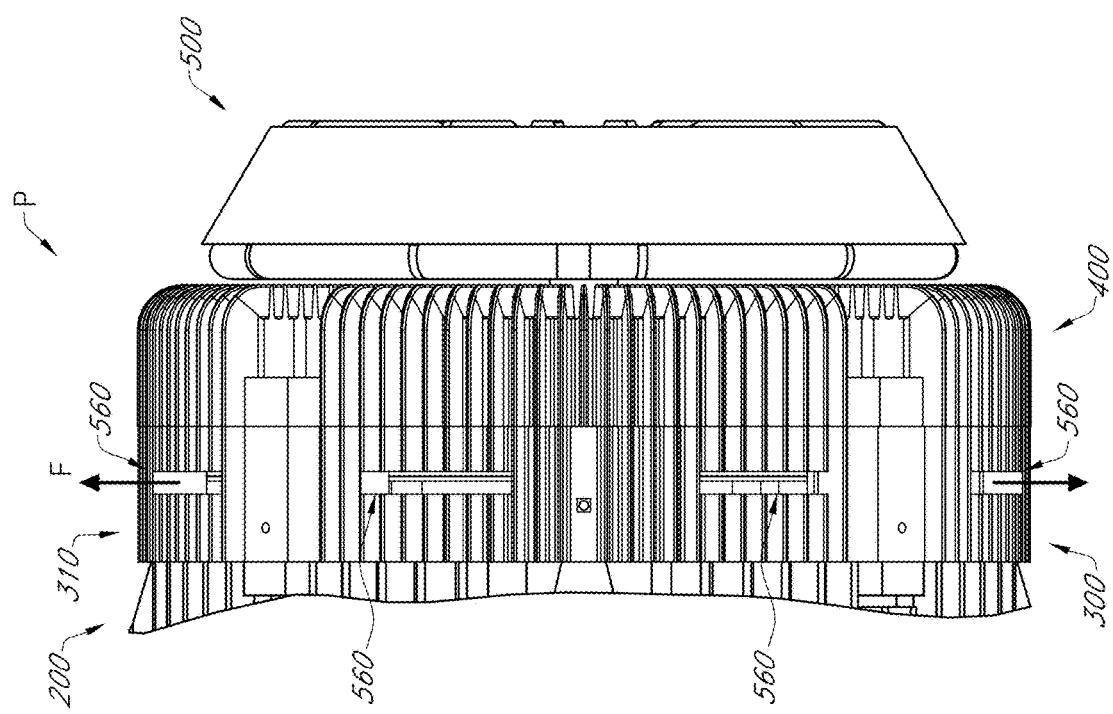
FIG. 3 is partial side view of the motor assembly of FIG. 2A.

FIGS. 2A-2B show a cross-sectional view of the motor assembly 1000. FIG. 3 shows a partial assembled side view of the motor assembly 1000.

The electric motor 100 includes a stator 110 disposed about the output shaft or rotor 120. A plate assembly P can detachably couple to the end 210 of the motor frame 200. Optionally, the plate assembly P can include a mid-plate 300 and an end-plate 400. In another implementation, discussed further below, the plate assembly P can instead include a single (e.g., integral, monolithic, single piece) plate. The plate assembly P optionally includes the bearing 140 via which it couples to the output shaft or rotor 120.

The mid-plate 300 is disposed proximate (e.g., adjacent) the end 210 of the motor frame 200, the end-plate 400 is disposed proximate (e.g., adjacent) the mid-plate 300 so that the mid-plate 300 is interposed between the motor frame 200 and the end-plate 400, and the fan 500 is disposed proximate (e.g.,) the end-plate 400 so that the end-plate 400 is interposed between the mid-plate 300 and the fan 500. The end-plate 400 has a cavity 420 that can house an electronic module (e.g., the electronic module 700). The fan 500 is rotatably coupled to the output shaft or rotor 120 via a mechanical connection 510 (e.g., spline, geared connection), so that rotation of the rotor 120 rotates the fan 500.

With continued reference to FIGS. 2A-3, the plate assembly P (e.g., one or both of the end-plate 400 and mid-plate 300) defines a flow path F through which air flow generated by the fan 500 flows. The flow path F can be defined at least in part by a channel 550 (e.g., annular channel) between the output shaft or rotor 120 and a wall (e.g., inner radial wall) 422 of the plate assembly P (e.g., of the end-plate 400). The channel 550 can extend generally parallel to at least a portion of the output shaft or rotor 120 (e.g., extend coaxially with the output shaft or rotor 120, extend along an axis parallel to an axis of the output shaft or rotor 120).

The flow path F can be defined at least in part by a duct or channel 555 defined in the plate assembly P (e.g., defined at least partially between a first wall 556 and a second wall 558 that are spaced apart from each other to define the open duct). At least a portion of the of the first and second walls 556, 558 can extend generally transversely (e.g., perpendicular) to the output shaft or rotor 120. The duct or channel 555 is in fluid communication (at an upstream end of the channel 555) with the channel 500 such that air flow passes through the channel 550 from the fan 500 and into the duct or channel 555 from the channel 550. The duct or channel 555 is in fluid communication (at a downstream end of the channel 555) with one or more openings 560 of the plate assembly P via which air flow exits the plate assembly P. One or both of the channel 550 and duct 555 define a cooling duct that can thermally isolate the electronic module in the cavity 420 from the electric motor 100 and motor frame 200, as further discussed below.

In one implementation, the duct or channel 555 includes one or more (e.g., a plurality of) separate ducts extending between the channel 550 and the one or more openings 560 (e.g., multiple ducts circumferentially distributed about a central axis X of the plate assembly P). In another implementation, the duct or channel 555 extends circumferentially about the central axis X such that air flows alongside substantially an entirely of the first and second walls 556, 558 circumferentially about the central axis X (e.g., the channel or duct 555 is defined by rotating the image in FIG. 2B about the central axis X).

In the illustrated implementation, the plate assembly P includes the mid-plate 300 and end-plate 400 that removably couple to each other. The channel 550 is defined in the end-plate 400 by the inner radial wall 422. The duct or channel 555 is defined in the mid-plate 300 between the walls 556, 558 of the mid-plate 300.

As best shown in FIG. 2B, the end-plate 400 has an outer radial wall 450 that extends from a shoulder 455 of the end-plate 400. The mid-plate 300 has an outer radial wall 350 that extends from a first end 351 to a second end 352, and heat sink fins 310 that extend from the outer radial wall 350. The outer radial wall 350 extends over the outer radial wall 450 of the end-plate 400 (e.g., the outer radial wall 450 is disposed radially inward of the outer radial wall 350) so that the first end 351 is proximate (e.g., adjacent) the shoulder 455. The second end 352 is disposed proximate (e.g., adjacent) the end 210 of the motor frame 200 and has a lip 354 that extends into a recessed portion of the motor frame 200 and adjacent an inner surface 215 of the motor frame 200.

The mid-plate 300 has a cavity or recess 340 that faces the end 210 of the motor frame 200 and is defined at least in part by the outer radial wall 350, a wall 342 that extends generally parallel to at least a portion of the wall 558, and an inner radial wall 355 that defines the central opening 320 of the mid-plate 300. The bearing 140 is disposed between the output shaft or rotor 120 and the inner radial wall 355.

In operation, the electric motor 100 can be operated to rotate the output shaft or rotor 120, which in turn rotates the fan 500 to generate air flow. Air flows from the fan 500 through the flow path F, first (axially) through the channel 550 and then (at least partially in a radial direction) through the duct or channel 555. Said air flow exits the plate assembly P via the one or more (e.g. plurality of) openings 560 of the plate assembly P (e.g., of the mid-plate 300). Such air flow along the flow path F to advantageously thermally insulate (e.g., thermally isolate) the cavity or chamber 420, and the electronics (e.g., electronic module 700) therein, from the heat generated by the motor 100, thereby inhibiting damage to said electronics from such heat.

Figure 4:
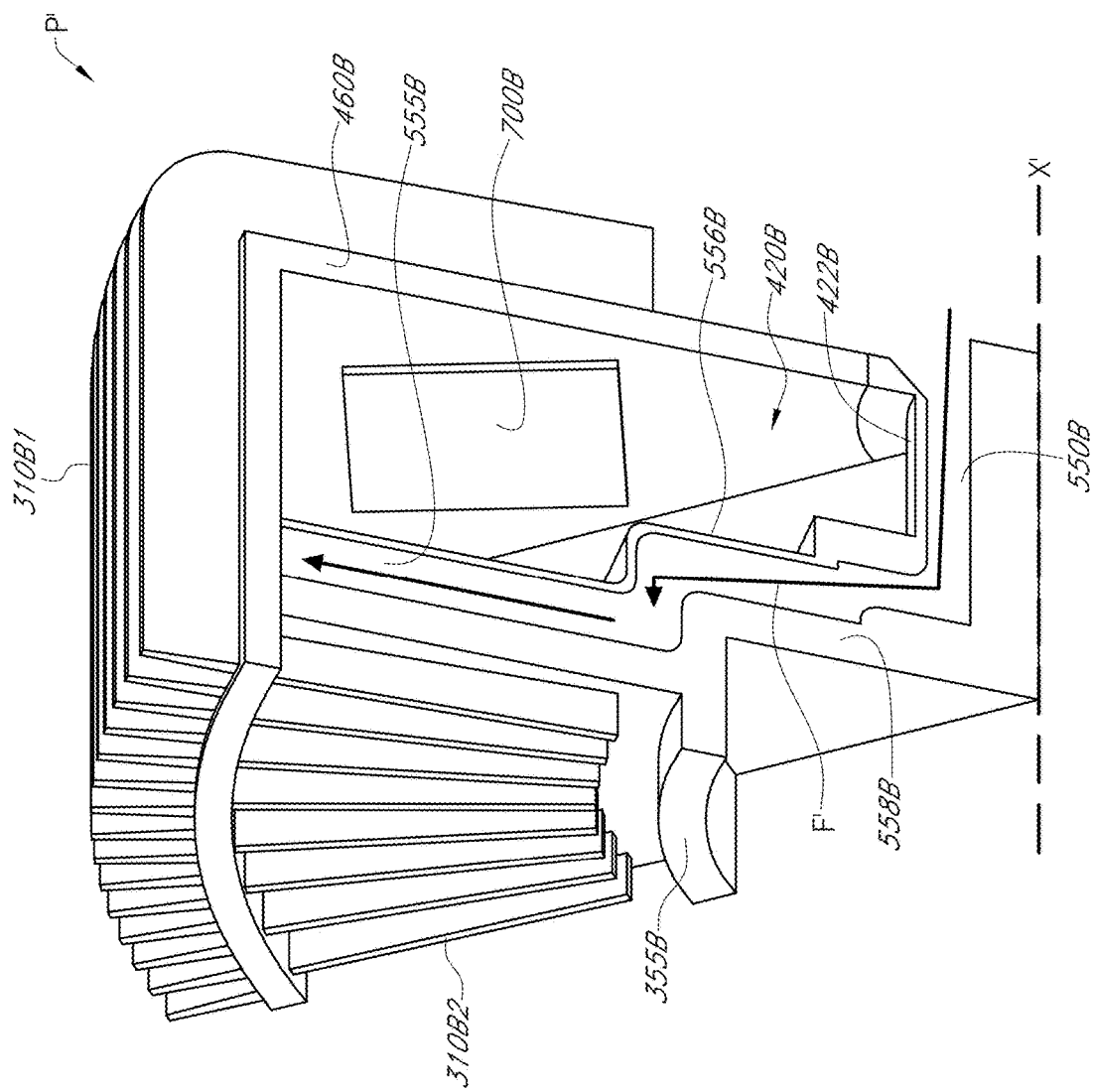
FIG. 4 is partial perspective view of a plate assembly of a motor assembly for driving a pump or rotary device, in accordance with another example.
Figure 5:
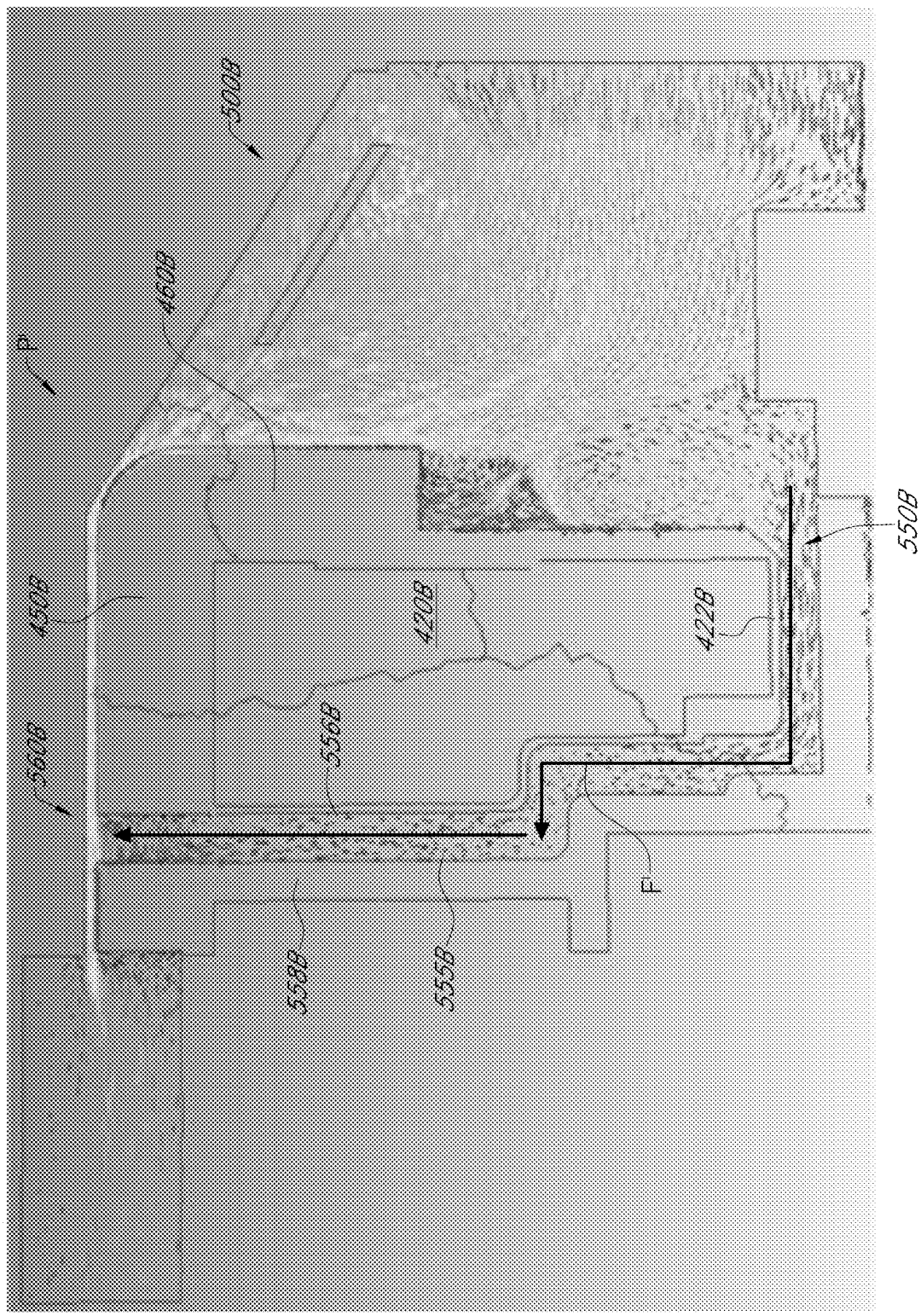
FIG. 5 is a schematic cross-sectional view of the plate assembly in FIG. 4 showing an air velocity flow diagram through the flow path during operation of the motor assembly.
Figure 6:
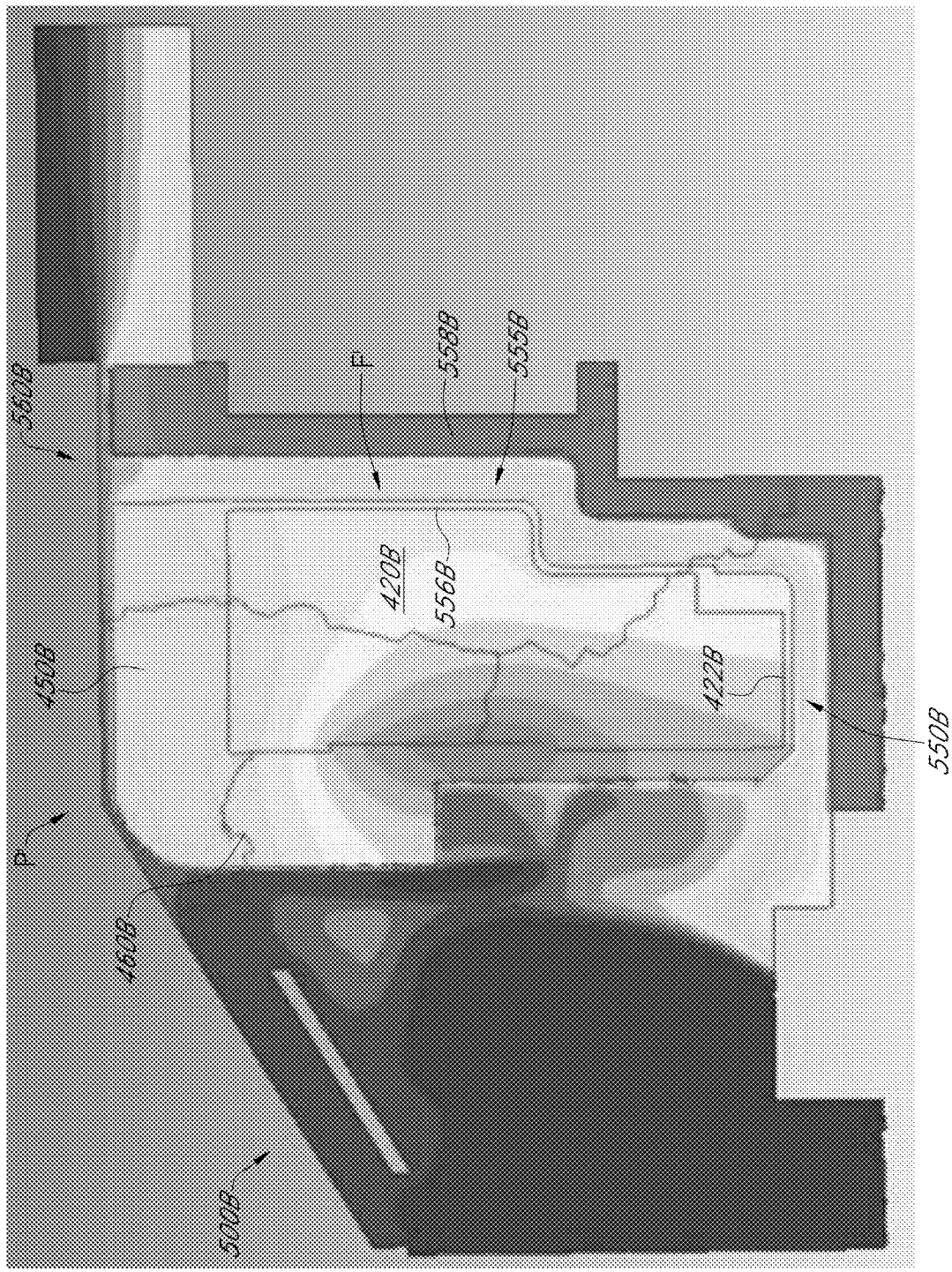
FIG. 6 is a schematic cross-sectional view of the plate assembly in FIG. 4 showing a temperature contour diagram during operation of the motor assembly.

FIGS. 4-6 shows a partial perspective view of a plate assembly P' for use in an electric motor assembly, such as the electric motor assembly 100. The plate assembly P' is similar to the plate assembly P in FIGS. 2A-3. Thus, reference numerals used to designate the various components of the plate assembly P' are similar to those used for identifying the corresponding components of the plate assembly P in FIGS. 2A-3, except that an "B" has been added to the numerical identifier. Therefore, the structure and description for the various features of the plate assembly P in FIGS. 2A-3 are understood to also apply to the corresponding features of the plate assembly P' in FIGS. 4-6, except as described below.

The plate assembly P' differs from the plate assembly P in FIGS. 2A-3 in that the plate assembly P' is a single piece (e.g., does not include a separate mid-plate 300 and end-plate 400). The plate assembly P' can have a cavity or chamber 420B defined between an end wall 460B and a first wall 556B that extend generally transverse to a central axis X' of the plate assembly P'. The cavity or chamber 420B can house an electronic module 700B therein.

The plate assembly P' includes a flow path F' through which air can flow (e.g., when the fan, such as fan 500, coupled to the output shaft or rotor 120 is rotated). The flow path F' is defined at least in part by a channel 550B (e.g., annular channel) that extends between a central axis X' of the plate assembly P'(e.g., between the output shaft or rotor when the plate assembly P' is coupled to it) and a wall (e.g., inner radial wall) 422B of the plate assembly P'. The channel 550B can extend generally parallel to at least a portion of the central axis X' (e.g., extend coaxially with the central axis X', extend along an axis parallel to the central axis X', extend coaxially with or parallel to the output shaft or rotor when the plate assembly P' is coupled to it).

The flow path F' can be defined at least in part by a duct or channel 555B defined in the plate assembly P' (e.g., defined at least partially between the first wall 556B and a second wall 558B that are spaced apart from each other to define the open duct). At least a portion of the of the first and second walls 556B, 558B can extend generally transversely (e.g., perpendicular) to the central axis X' (e.g., to the output shaft or rotor when the plate assembly P' is coupled to it). The duct or channel 555B is in fluid communication (at an upstream end of the channel 555B) with the channel 500B such that air flow passes through the channel 550B (due to operation of the fan 500) and into the duct or channel 555B from the channel 550B. The duct or channel 555B is in fluid communication (at a downstream end of the channel 555B) with one or more openings 560B of the plate assembly P' via which air flow exits the plate assembly P'. One or both of the channel 550B and duct 555B define a cooling duct that can thermally isolate the electronic module in the cavity 420B from the electric motor 100 and motor frame 200, as further discussed below.

In one implementation, the duct or channel 555B includes one or more (e.g., a plurality of) separate ducts extending between the channel 550B and the one or more openings 560B (e.g., multiple ducts circumferentially distributed about a central axis X' of the plate assembly P'). In another implementation, the duct or channel 555B extends circumferentially about the central axis X' such that air flows alongside substantially an entirely of the first and second walls 556B, 558B circumferentially about the central axis X' (e.g., the channel or duct 555B is defined by rotating the image in FIG. 4 about the central axis X').

In operation, the electric motor 100 can be operated to rotate the output shaft or rotor 120, which in turn rotates the fan 500 to generate air flow. Air flows from the fan 500 through the flow path F', first (axially) through the channel 550B and then (at least partially in a radial direction) through the duct or channel 555B. Said air flow exits the plate assembly P' via the one or more (e.g. plurality of) openings 560B of the plate assembly P'. Such air flow along the flow path F' to advantageously thermally insulate (e.g., thermally isolate) the cavity or chamber 420B, and the electronics (e.g., electronic module 700B) therein, from the heat generated by the motor 100, thereby inhibiting damage to said electronics from such heat.

FIG. 5 shows a schematic cross-sectional view of the plate assembly P' in FIG. 4, showing an air velocity flow diagram through the flow path F', for example, during operation of the fan 500.

FIG. 6 shows a schematic cross-sectional view of the plate assembly P' in FIG. 4 showing a temperature contour diagram of the plate assembly P' during operation of the fan 500 to cause air flow to flow through the flow path F'. The temperature contour diagram shows that the chamber 420B remains relatively cool while the second wall 558B increases in temperature. Testing of the plate assembly P, P' with the cooling duct and air flow path F, F' as compared to a plate assembly that instead used an insulation material resulted in a reduction in the temperature increase the chamber 420B was exposed to from the motor 100, as well as a reduction in the temperature the power module in the plate assembly P, P' was exposed to, as shown in table 1 below.

TABLE 1

Temperature comparison of Plate Assembly Thermal Insulation

| Plate Assembly Insulation | Maximum Power Module Temperature Rise (K) | Chamber Average Temperature Rise (K) |
|---|---|---|
| Insulation Material | 93.2 | 76.3 |
| Cooling Duct | 90 | 66.7 |

FIG. 7 shows a power plane side of the mid-plate 300 (e.g., a side of the mid-plate 300 that faces toward the end-plate 400). The mid-plate 300 can have a wall 556 that faces the end-plate 400 when the electric motor assembly 1000 is assembled. The mid-plate 300 can have one or more (e.g., multiple) fastener holes 360 that can optionally receive fasteners (e.g., bolts) to couple the mid-plate 300 to the end-plate 400.

Figure 8:
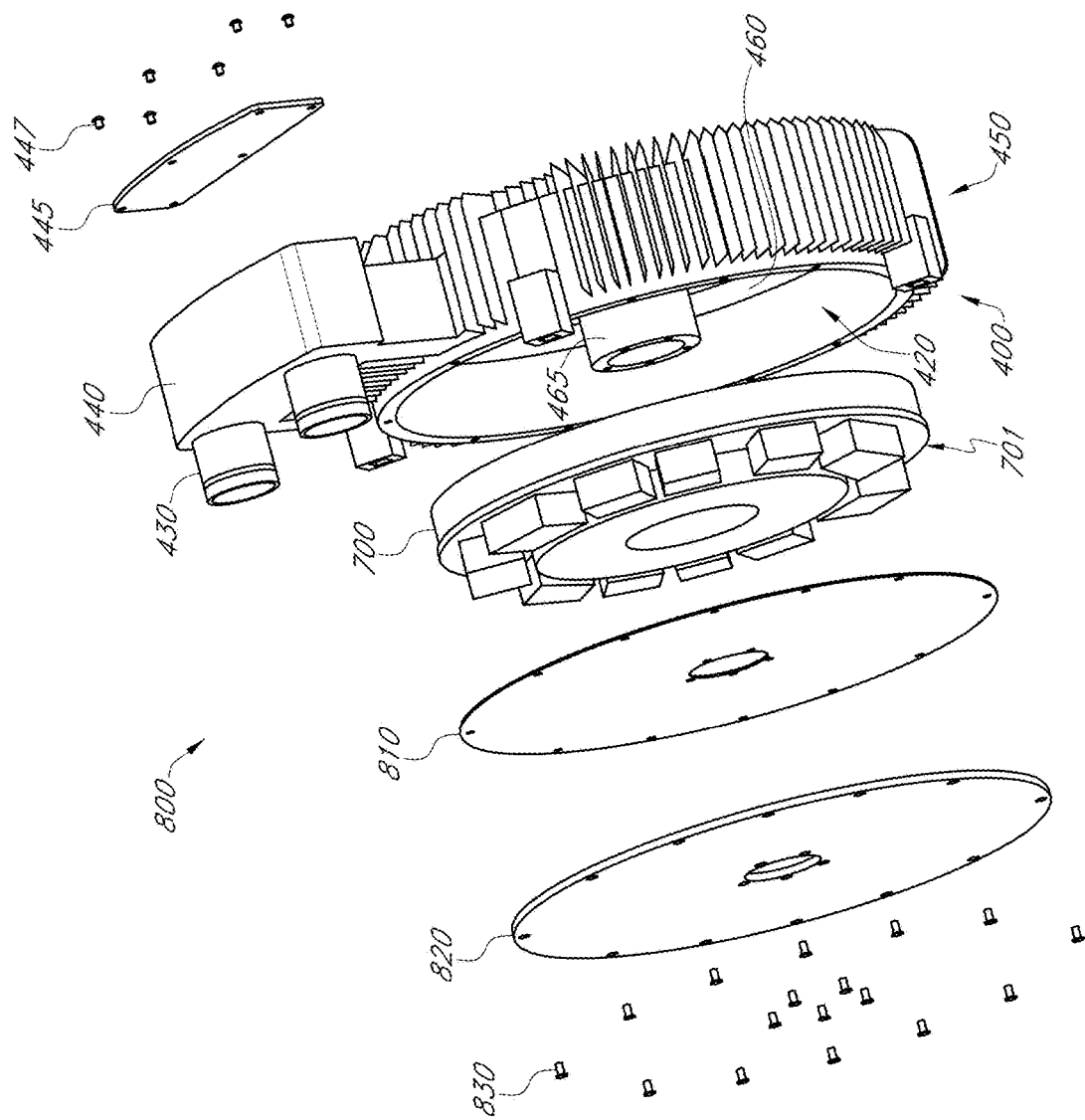
FIG. 8 is an exploded view of an end-plate assembly of the motor assembly and the drive module electronics therein.

FIG. 8 shows an exploded view of a drive module assembly 800 of the electric motor assembly 1000. The drive module assembly 800 includes the end-plate 400 with the cavity or chamber 420 defined at least in part by the end wall 460 and circumferential outer wall 450. The end-plate 400 also has a hub 465 that defines the opening 410 at the center of the end-plate 400, and also includes the terminal box connector 440 with the channels 430 that receive the connector wires 610 of the terminal box 600. A connector cover 445 can be attached to the terminal box connector 440 with one or more fasteners 447 (e.g., screws, bolts). The drive module assembly 800 also includes the electronics module 700, discussed further below, which can be housed in the chamber 420. The chamber 420 has a generally circular shape and receives a similarly shaped electronic module 700 therein. Once the electronic module 700 is in the chamber 420, the chamber 420 can be covered with one or both of an end-plate cover gasket or insulator 810 and an end-plate cover 820 optionally using one or more fasteners (e.g., bolts, screws) 830.

Figure 9:
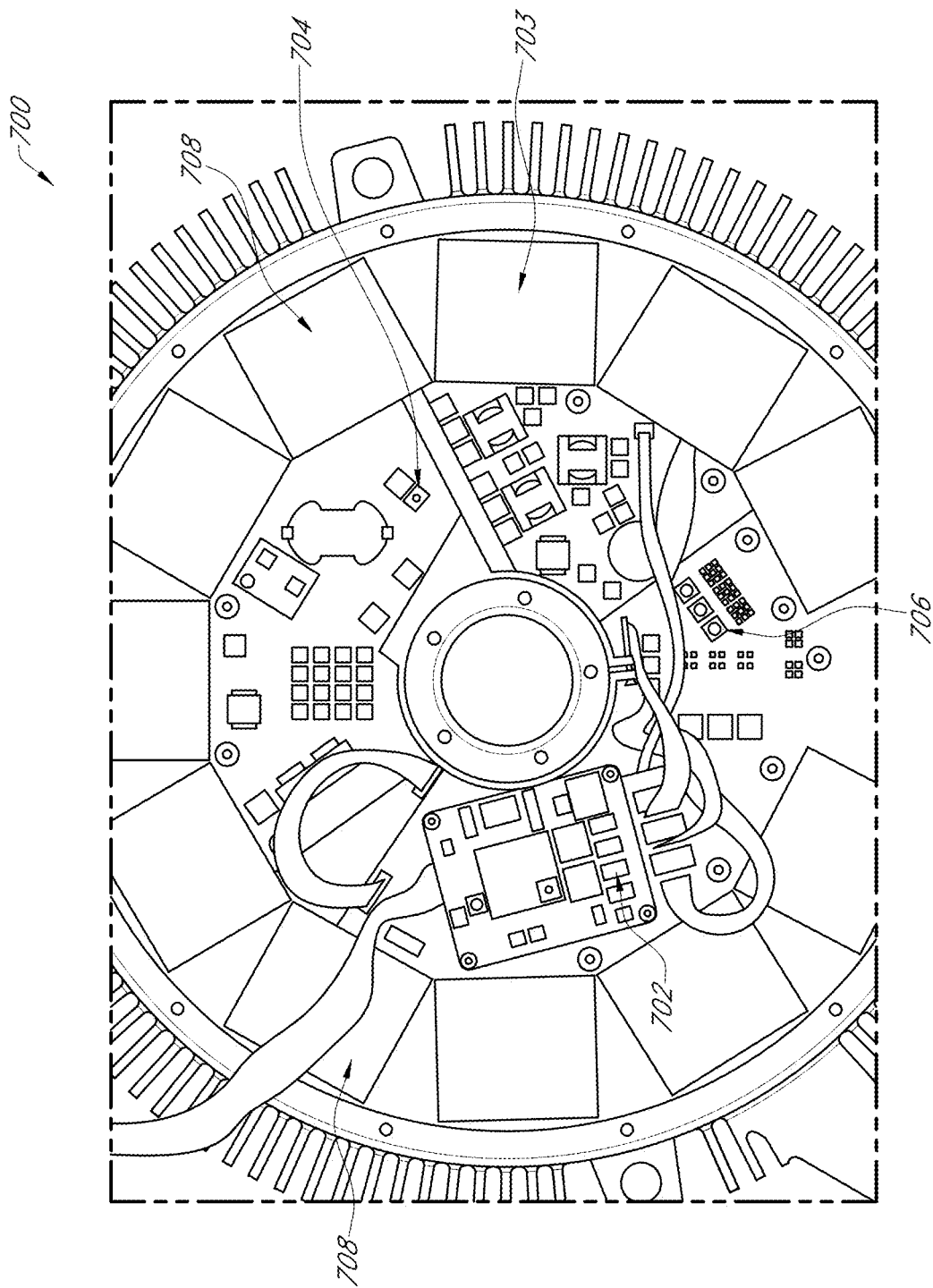
FIG. 9 is a partial view of a motor side of the end-plate assembly of FIG. 8.
Figure 10:
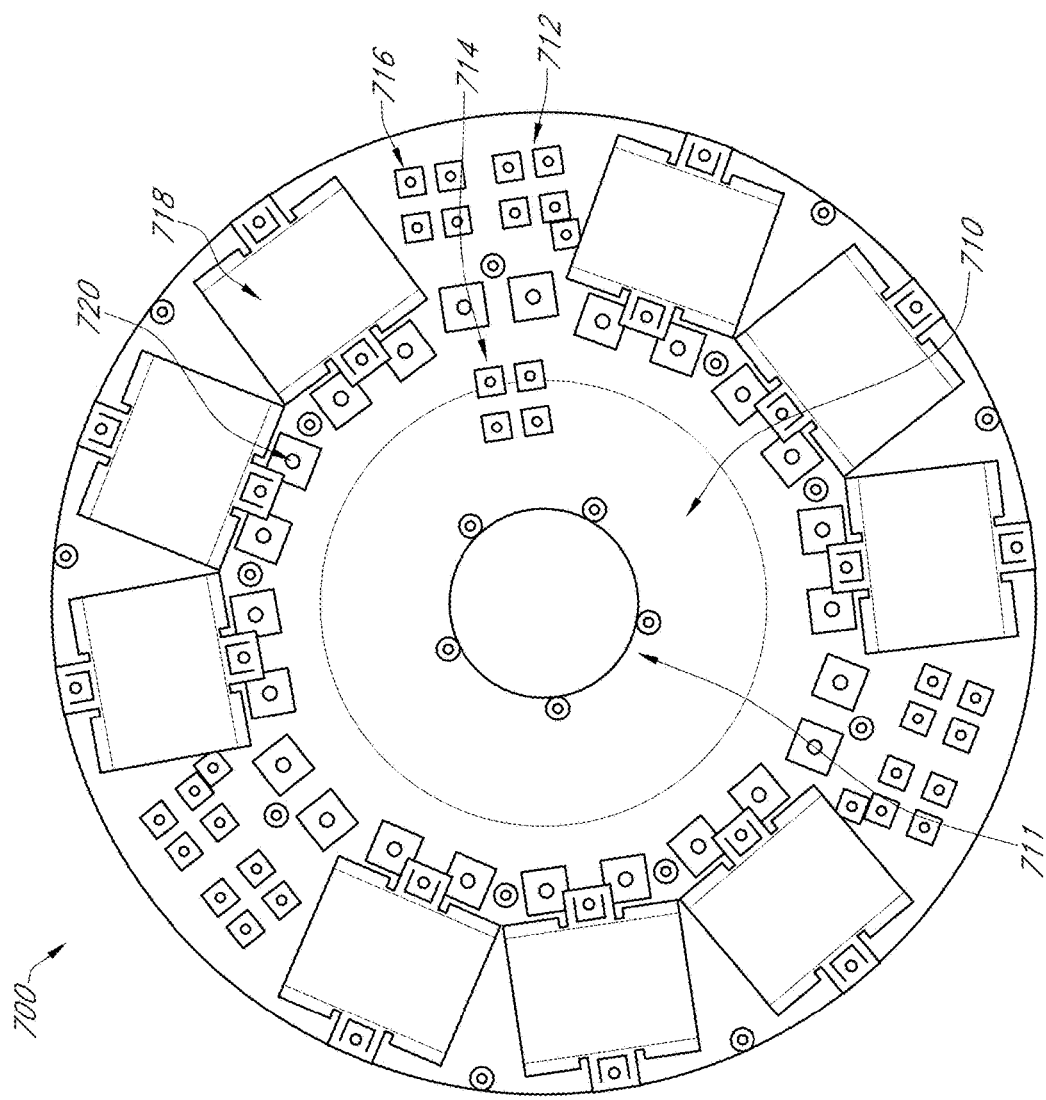
FIG. 10 is a rear view of a power plane printed circuit board layer housed in the end-plate assembly of FIG. 8.
Figure 11:
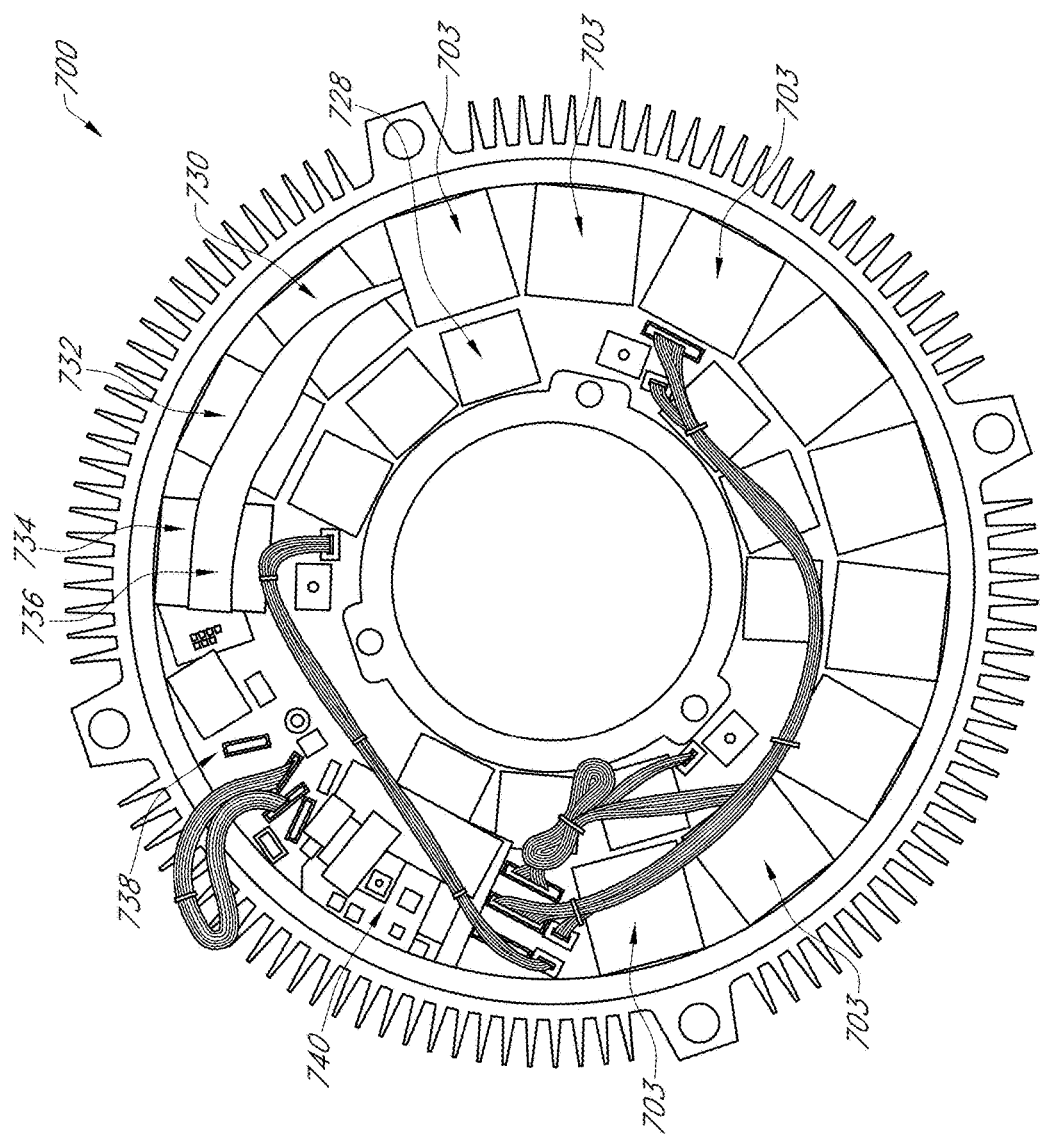
FIG. 11 shows an assembled matrix converted in the end-plate assembly of FIG. 8.

FIGS. 9-11 show features of the electronic module 700. The electronic module 700 can provide power and control functionality to operate the electric motor assembly 1000 in order to drive the pump or other rotary device coupled to the electric motor assembly 1000. The electronic module 700 can have a printed circuit board or power plane assembly 710 with a circular shape (e.g., annular shape with a central opening 711). The electronic module 700 can be disposed in the chamber 420 of the end-plate 400 so that the central opening 711 is disposed about the hub 465 and an outer edge 701 of the printed circuit board or power plane assembly 710 is disposed inward of the circumferential outer wall 450 of the end-plate 400. Accordingly, the electronics can be arranged circumferentially about the hub 465 on the printed circuit board or power plane assembly 710 so that the power and control electronics are housed in the chamber 420 of the end-plate 400.

The printed circuit board or power plane assembly 710 can optionally be a multi-layer circuit board or assembly, and can be constructed of a laminated material, such as fiberglass, which can advantageously insulate the hotter power semi-conductors from more temperature sensitive control electronics and power quality capacitors. For example, the printed circuit board or power plane assembly 710 can have a power layer, a control layer, a thermal barrier and a printed circuit board layer.

The power layer can include one or more higher temperature power modules (PM1-PM9) 718 operable to provide power to the electric motor 100. The control layer can include lower temperature control electronics modules, such as one or more power quality or input filter capacitors (IFC) 703 for controlling the power provided to the electric motor 100. The power modules (PM1-PM9) 718 can be on an opposite side of the printed circuit board or power plane assembly 710 (e.g., on opposite sides of the thermal barrier) from the power quality or input filter capacitors (IFC) 703. The thermal barrier and printed circuit board layer can be between the power layer and the control layer and provide electrical connection paths between the power modules 718 of the power plane and the control electronics modules (e.g., power quality or input filter capacitors 703) of the control layer, allowing the interconnection of these components. The printed circuit board or power plane assembly 710 also advantageously provides thermal insulation between the power layer and the control layer. The printed circuit board or power plane assembly 710 advantageously insulates and/or directs heat emitted from one or more of the power modules 718, the control electronics modules such as the input filter capacitors (IFC) 703 and output shaft or rotor 120 of the electric motor 100 to the outer edge 701 of the printed circuit board or power plane assembly 710 where higher air flow from the fan 500 is directed.

With reference to FIG. 9, the electronic module 700 can include, in addition to one or more (e.g., a plurality of) power quality or input filter capacitors (IFC) 703, a controller 702, a main power supply 704, a gate drive layer 706 and one or more clamp capacitors 708 on one side of the printed circuit board or power plane assembly 710. With reference to FIG. 10, the opposite side of the printed circuit board or power plane assembly 710 can include, in addition to the power modules 718, one or more output clamp diode connections 712, a clamp insulated-gate bipolar transistor (IGBT) connection 714, one or more shunt resistor connections 716, and one or more input filter capacitor (IFC) connections 720.

FIG. 11 shows a an assembled electronic module 700 arranged in the chamber 420 of the end-plate 400. The electronic module 700 includes one or more input filter capacitors 703, a gate driver power supply 728, one or more controller cards 740, one or more clamp capacitors 730, 732, 734 and a clamp control circuit 738, and a copper connection 736. The electronic module 700 can include a matrix converter to convert a multi-phase AC input of fixed voltage and frequency into a multi-phase AC output waveform of a desired frequency and phase. Therefore, the matrix converter is able to synthesize AC output waveforms of desired frequency and phase relative to the input AC waveforms. Since the rate at which electric motors, such as the electric motor 100 rotates is based on the frequency of the applied AC input signal, using a matrix converter to power the electric motor 100 allows for variable drive control. For example, the frequency of the AC output waveform provided by the matrix converter can be changed over time to thereby operate the electric motor 100 at the desired speed. The electronic module 700 provides an embedded motor drive (EMD) that operates similar to a variable frequency drive (VFD) and that controls the input frequency and voltage to the electric motor 100 to allow more precise speed control for the electric motor 100 (e.g., allowing the motor 100 to run at speeds higher than the input line frequency). The embedded motor drive (EMD) advantageously provides for improved reliability, increased throughput and reduced energy consumption for the electric motor assembly 1000.

The circular shape of the electronic module 700 advantageously allows it to fit within the chamber 420 of the end-plate 400, allowing ease of manufacture and installation of its components. As the end-plate 400 can be detached from the motor frame 200, maintenance of the electronic module 700 (e.g., to replace one or more components, such as a faulty or damaged transistor) is simplified. Additionally, the circular shape of the electronic module 700 allows existing electric motor assemblies to be retrofitted with the electronic module 700 to provide such an assembly with the embedded motor drive or variable frequency drive provided by the electronic module 700 (e.g., by installing the electronic module 700 in the standard sized end-plate of the electric motor assembly).

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An electric motor assembly, the electric motor assembly comprising:
   an electric motor having a rotor shaft that extends along a rotor shaft axis of the electric motor, the electric motor being operable to rotate the rotor shaft;
   a motor frame that houses the electric motor, the rotor shaft protruding from the motor frame;
   a cooling fan; and
   a motor drive electronics assembly removably mounted to a non-drive end of the motor frame between the motor frame and the cooling fan, the motor drive electronics assembly having a cavity that houses motor drive electronics, the motor drive electronics assembly further defining a duct that extends, from an inlet formed on an end surface of the motor drive electronics assembly that is distal to the motor frame, to one or more outlets formed on an outer radial wall of the motor drive electronics assembly,
   wherein, during operation of the cooling fan, air blows on the end surface of the motor drive electronics assembly, and air blows through the duct by entering the inlet and exiting the one or more outlets, and wherein at least a portion of the duct extends between the electric motor and the motor drive electronics, radially in a direction perpendicular to an axis of the rotor shaft.

2. The electric motor assembly of claim 1 wherein a portion of the duct extends circumferentially about the rotor shaft axis.

3. The electric motor assembly of claim 1 wherein the motor drive electronics assembly removably couples to the rotor shaft at the non-drive end of the motor frame via a rotor shaft bearing.

4. The electric motor assembly of claim 1 wherein the cavity is bounded at least in part by a first surface of the motor drive electronics assembly that is proximal to the motor frame and a second surface of the motor drive electronics assembly that opposes the first surface and is distal to the motor frame in relation to the first surface.

5. The electric motor assembly of claim 4 wherein, during operation of the cooling fan, the cooling fan operates to cool both the first surface and the second surface.

6. The electric motor assembly of claim 1 wherein the motor drive electronics assembly comprises one or more heat sink fins formed on the end surface.

7. The electric motor assembly of claim 1 further comprising a shroud cover removably disposable over the motor drive electronics assembly and the cooling fan.

8. The electric motor assembly of claim 1 wherein the rotor shaft extends through a central opening of the motor drive electronics assembly and the cooling fan is driven by a portion of the rotor shaft that protrudes from the central opening.

9. An electric motor assembly, the electric motor assembly comprising:
an electric motor having a rotor shaft that extends along a rotor shaft axis of the electric motor, the electric motor being operable to rotate the rotor shaft;
a motor frame that houses the electric motor, the rotor shaft protruding from the motor frame;
a cooling fan; and
a motor drive electronics assembly removably mounted to a non-drive end of the motor frame between the motor frame and the cooling fan, the motor drive electronics assembly having a cavity that houses motor drive electronics, the motor drive electronics assembly further defining a duct that extends, from a inlet formed on an end surface of the motor drive electronics assembly that is distal to the motor frame, to one or more outlets formed on an outer radial wall of the motor drive electronics assembly,
wherein, during operation of the cooling fan, air blows on the end surface of the motor drive electronics assembly, and air blows through the duct by entering the inlet and exiting the one or more outlets, and
wherein the duct is in fluid communication with the cooling fan via an axial channel defined in the motor drive electronics assembly about the rotor shaft.

10. The electric motor assembly of claim 9 wherein at least a portion of the duct extends between the electric motor and the motor drive electronics, radially in a direction perpendicular to an axis of the rotor shaft.

11. A motor drive electronics assembly configured for use with an electric motor, the motor drive electronics assembly comprising:
a first end configured to be removably mounted to a non-drive end of a motor frame of an electric motor;
a second end opposite the first end and having a cooling duct inlet;
an outer radial wall with one or more cooling duct outlets;
a cooling fan positioned to blow air on the second end;
motor drive electronics within a cavity, the cavity defined at least in part by the outer radial wall; and
a cooling duct extending from the cooling duct inlet to the one or more cooling duct outlets, wherein, during operation of the cooling fan, air blows on the second end of the motor drive electronics assembly, and air blows through the cooling duct by entering the cooling duct inlet and exiting the one or more cooling duct outlets, and
wherein the cooling duct is in fluid communication with the cooling fan via an axial channel defined in the motor drive electronics assembly about a rotor shaft of the electric motor.

12. The motor drive electronics assembly of claim 11 wherein the motor drive electronics assembly removably couples to a rotor shaft of the electric motor at the non-drive end of the motor frame via a rotor shaft bearing.

13. The motor drive electronics assembly of claim 11 wherein the cavity is bounded at least in part by a first surface proximal to the first end of the motor drive electronics assembly and a second surface that opposes the first surface and is distal to the first end in relation to the first surface.

14. The motor drive electronics assembly of claim 13 wherein, during operation of the cooling fan, the cooling fan operates to cool both the first surface and the second surface.

15. The motor drive electronics assembly of claim 11 wherein the motor drive electronics assembly comprises one or more heat sink fins formed on the second end.

16. The motor drive electronics assembly of claim 11 further comprising a central opening adapted to receive a rotor shaft of the electric motor, and wherein the cooling fan is configured to be driven by a portion of the rotor shaft that protrudes from the central opening when the motor drive electronics assembly is mounted to the motor frame.

17. A motor drive electronics assembly configured for use with an electric motor, the motor drive electronics assembly comprising:
a first end configured to be removably mounted to a non-drive end of a motor frame of an electric motor;
a second end opposite the second end and having a cooling duct inlet;
an outer radial wall with one or more cooling duct outlets;
a cooling fan positioned to blow air on the second end;
motor drive electronics within a cavity, the cavity defined at least in part by the outer radial wall; and
a cooling duct extending from the cooling duct inlet to the one or more cooling duct outlets,
wherein, during operation of the cooling fan, air blows on the second end of the motor drive electronics assembly, and air blows through the cooling duct by entering the cooling duct inlet and exiting the one or more cooling duct outlets,
wherein at least a portion of the cooling duct extends between the electric motor and the motor drive electronics, radially in a direction perpendicular to an axis of a rotor shaft of the electric motor.

18. The motor drive electronics assembly of claim 17 wherein a portion of the cooling duct extends circumferentially about the axis of the rotor shaft.

19. The motor drive electronics assembly of claim 17 wherein the cooling duct is in fluid communication with the cooling fan via an axial channel defined in the motor drive electronics assembly about a rotor shaft of the electric motor.

* * * * *